INVENTOR.
HENRY H. W. QUENZLER
BY THEODORE W. SCHMIDT

AGENT

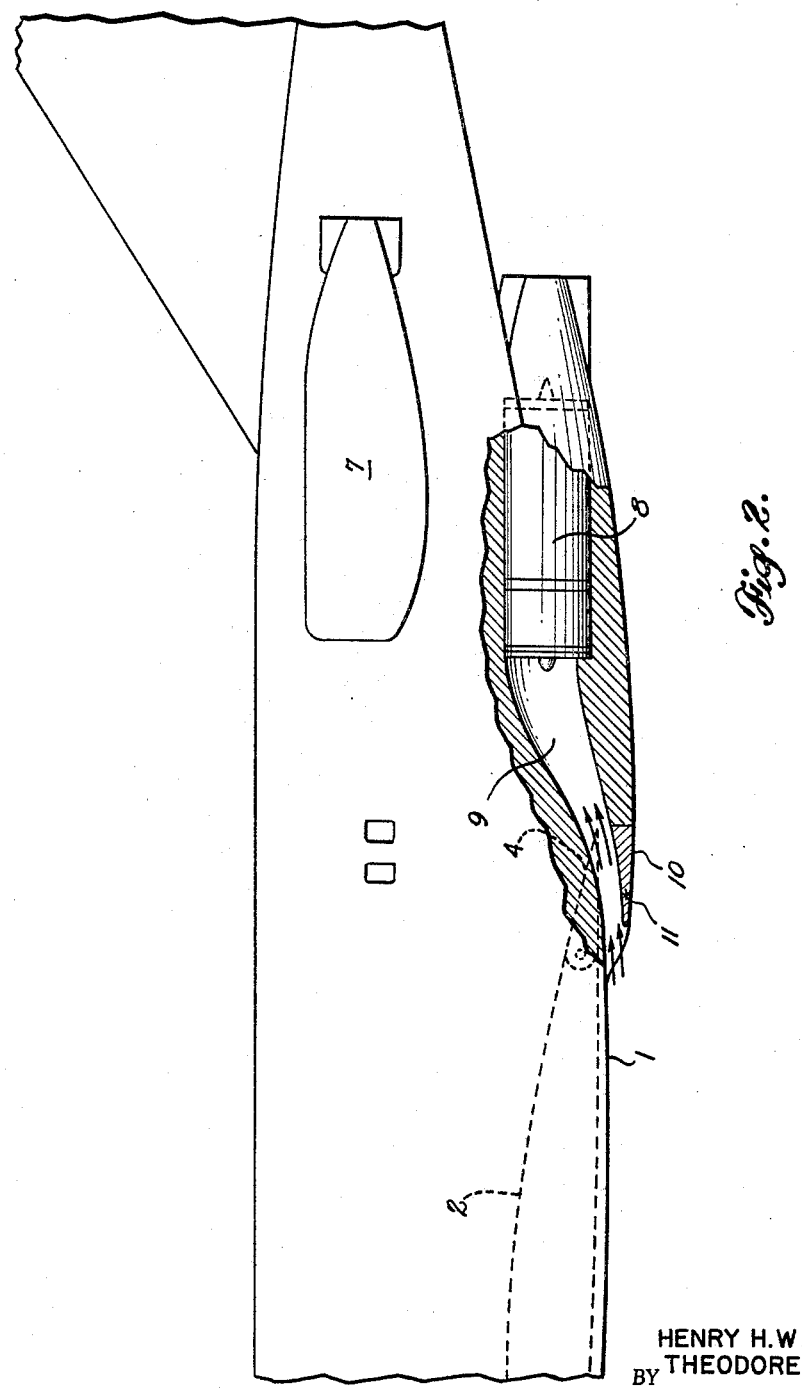

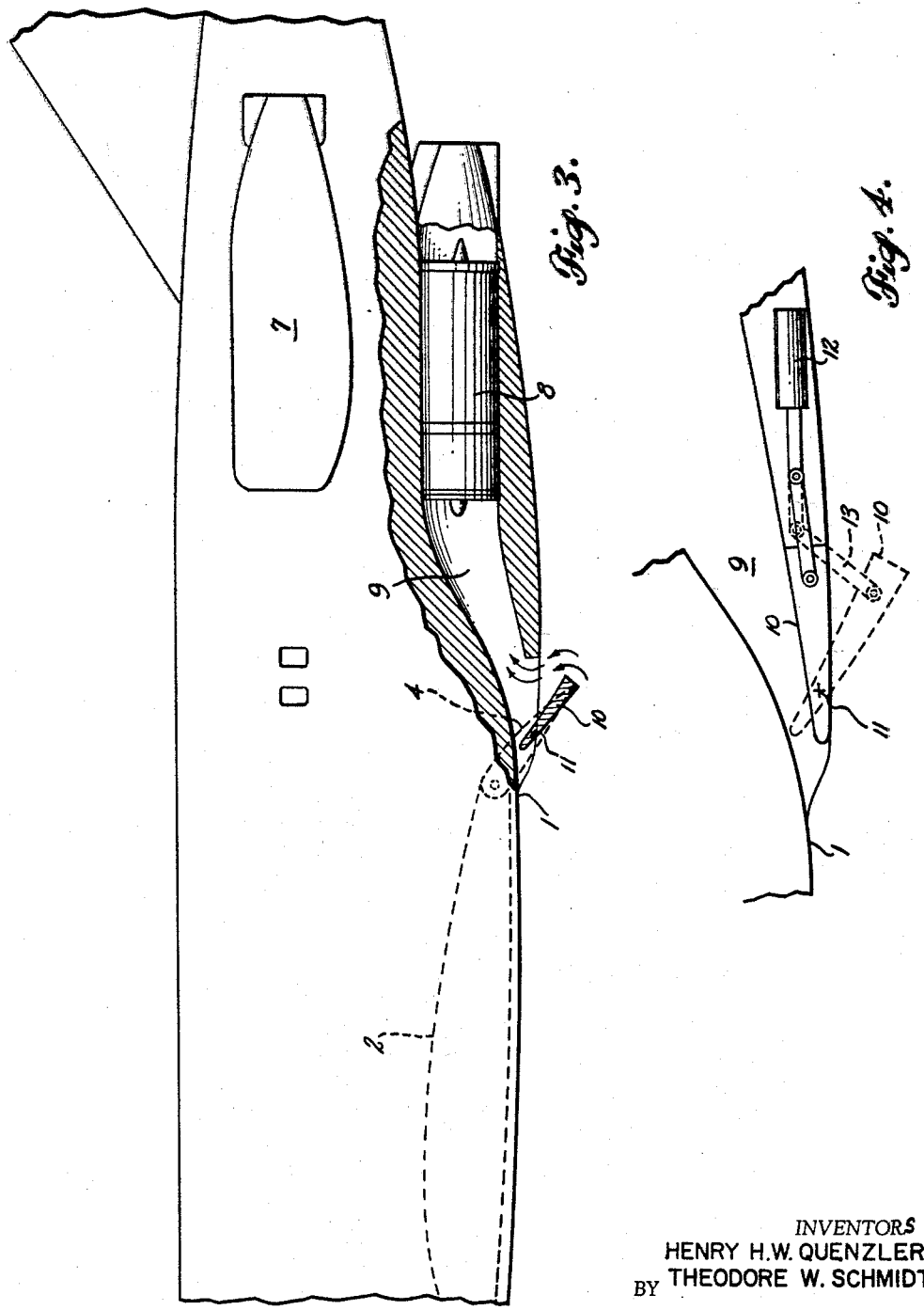

United States Patent Office 3,109,610
Patented Nov. 5, 1963

3,109,610
COMBINED AIRCRAFT AIR INTAKE SCOOP, FOREIGN MATERIAL INGESTION INHIBITOR, AND AERODYNAMIC FLAP
Henry H. W. Quenzler and Theodore W. Schmidt, Seattle, Wash., assignors to The Boeing Company, Seattle, Wash., a corporation of Delaware
Filed Sept. 12, 1962, Ser. No. 223,192
13 Claims. (Cl. 244—15)

This invention relates to aircraft, and more particularly to aircraft utilizing internal combustion reaction type engines.

In present day reaction type engines, especially those which are mounted on aircraft for propulsion thereof and utilize a boundary layer fed air intake, it is required that large quantities of air be supplied thereto to support combustion and the flow of such quantities through one or more relatively small inlets results in flow velocities in the magnitude of hundreds of feet per second. It is well recognized and readily apparent that when foreign objects such as gravel, debris, small metallic parts, ice, birds and other material of similar nature are projected into the high velocity inflow to the engine the probability is great that such foreign objects will be carried into the engine. In those engines employing rotary impellers or compressors to induce the flow of air into the inlet, such impellers revolve at a high rate and at such high rate the balance of the impeller is critical. The collision between ingested foreign objects and the impeller can readily damage the impeller to such an extent as to render it unbalanced which in some instances can result in destructive vibration. Even though the damage to the impeller does not lead to destructive unbalance or the damage is inflicted on other parts of the engine, such as the stator blades of the compressor, such damage must be repaired to insure economic and efficient engine operation and to safeguard against propagation of the damage which would result in subsequent engine failure.

Heretofore efforts have been directed along three lines of approach to a solution for preventing foreign objects from entering jet engine inlets when such engines are operating near the ground. The first of these approaches offers without question an ideal solution and involves the removal of all foreign objects on the ground by such means as huge self propelled vacuum type cleaners. However, the magnitude of labor and equipment involved in such an undertaking is prohibitive. The second line of approach has been to filter the air as it enters the engine air inlet by the placement of a grille or screen over the inlet which will effectively prevent passage of objects into the engines. However, the screens seriously effect the efficiency of engine operation by reducing flow through the air inlet and under icing conditions these screens have been known to become ice encrusted to a degree at which full engine failure was experienced. The third line of approach has been to prevent or break up the formation of a vortex created by the air drawn into the engine, which extends from the ground surface to the engine inlet, by directing high pressure air into the point of stagnation of the air flow adjacent the ground surface thus disturbing the pattern of air flow on the ground and preventing the creation of the foreign material carrying vortex. However, this approach fails to prevent foreign material which is thrown upward by the wheels or air currents or prevent low flying birds from entering the engine.

This invention involves an entirely new and different approach to the problem of maintaining reaction type jet engines, which utilize boundary layer fed air intakes, free from foreign materials that would normally be drawn in during taxiing, takeoff or landing of the aircraft while at the same time functioning to provide additional aerodynamic control surfaces for augmenting takeoff and landing operations. The principal features of this invention includes an air scoop which functions as a flap pivoted about an axis which extends in the same general direction as the wing flaps to provide an extension of the air inlet duct during cruise and prevent foreign material from entering the air inlet duct during takeoff and landing while forming a substantially continuous efficient aerodynamic flap from the outboard tip of one wing flap to the outboard tip of the other wing flap.

Therefore, an object of this invention is to provide an aircraft utilizing boundary layer fed reaction type engines with means to prevent foreign material from entering the engines.

A further object of this invention is to provide such an aircraft with a substantially continuous aerodynamic flap from the outer tip of one wing flap to the outer tip of the other wing flap.

Another object of this invention is to provide such an aircraft with a device which operates to inhibit ingestion of foreign material by the engine while simultaneously operating as an aerodynamic flap.

These and other objects of the invention not specifically set forth above will become readily apparent from the accompanying description and drawings in which:

FIG. 2 is a side view of a portion of the aircraft of FIGURE 1 with sections cut away to show the invention in a non-actuated position;

FIG. 3 is a view similar to FIGURE 2 but showing the invention in actuated position for taxiing, takeoff and landing; and FIG. 4 schematically shows a control device for the ingestion inhibiting, aerodynamic flap of the invention.

Figure 1:
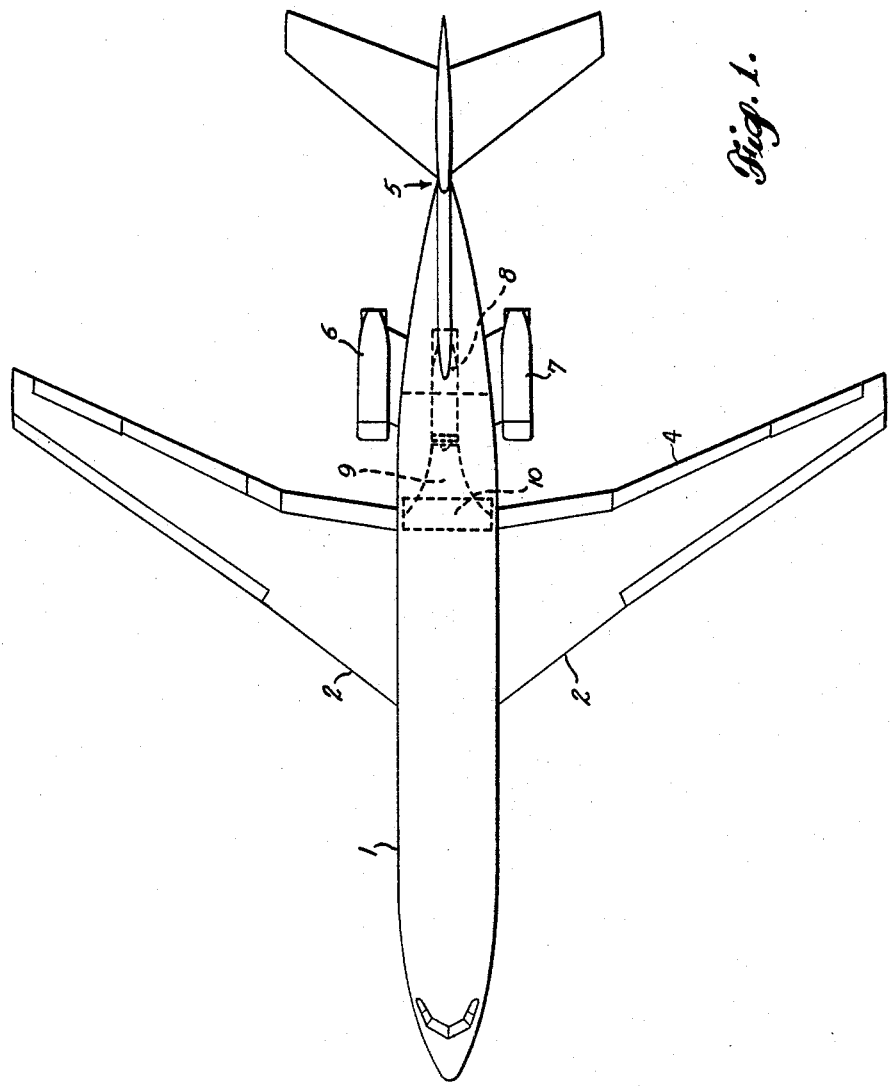
FIG. 1 is a plan view of an aircraft equipped with the invention.

The aircraft shown in the drawings for the purposes of illustration is a low wing jet propelled craft having a fuselage 1, wings 2 with a plurality of aerodynamic flaps 4 on the trailing edge of each wing, a tail section generally indicated at 5, and three reaction type jet engines 6, 7 and 8, positioned between wings 2 and tail section 5. Engines 6 and 7 are mounted on the side of fuselage 1 while engine 8 is mounted on the underside of the fuselage, as more clearly shown in FIGS. 2 and 3.

Referring now to FIGS. 2 and 3, engine 8 is provided with an inlet duct or channel 9 for directing air thereto. At the forward end of air inlet channel 9 is an intake lip or air scoop 10 pivoted about axis 11 to provide when in a horizontal position, as shown in FIG. 2, an extension of air inlet channel 9 thus providing unrestricted ram air flow to engine 8 during flight operation of the aircraft such as at cruise. Axis 11 is transverse to the longitudinal axis of fuselage 1, said transverse axis 11 passing thru the air scoop intermediate the leading and trailing edges thereof and extending in the same general direction as, and spaced from, the longitudinal axis of wing flaps 4. The portion of air scoop 10 which is forward of axis 11 is of greater length than the distance between axis 11 and fuselage 1 so that air scoop 10 when actuated by control means described hereinafter to a tilted position, as shown in FIG. 3, can effectively prevent ingestion of foreign material by the engine 8. As shown in FIG. 1, air scoop 10 is so positioned as to be in cooperative relationship with aerodynamic flaps 4 of wings 2, and axis 11 through the air scoop is directly below the axis of the wing root about which flaps 4 are pivoted (see FIG. 3). It can thus be seen that when air scoop 10 is in a tilted position it cooperates with wing flaps 4 to provide an efficient substantially continuous aerodynamic flap from the outboard tip of one wing flap to the outboard tip of the other wing flap.

During flight conditions, such as at cruise, the probability of foreign material entering air inlet channel 9 is very small and thus ingestion inhibitors are not deemed to be of sufficient value to offset the loss of engine efficiency created thereby. However, during taxiing, takeoff and landing operation of the aircraft ingestion protection for the engines is essential, especially for engines utilizing air inlet devices, such as inlet channel 9, which consumes the boundary layer air adjacent to the underside of fuselage 1. In accordance with the invention, this is accomplished in a simple and effective manner by actuating air scoop 10 to a tilted position as shown in FIG. 3 by control means as described hereinafter, whereby low flying birds or foreign material thrown upward by the wheels of the aircraft or by air currents is deflected away from air inlet channel 9 by air scoop 10. While air scoop 10 is in the tilted position, air is supplied to the inlet channel through the opening between inlet channel 9 and the trailing edge of the air scoop 10 as shown by the arrows in FIG. 3.

It is thus seen that in a tilted position air scoop 10 effectively inhibits foreign material from entering engine 8, while allowing sufficient air to be supplied to the engine, and simultaneously functions as an aerodynamic flap in conjunction with wing flaps 4 to augment takeoff and landing of the aircraft.

Referring now to the control means for air scoop 10 as shown in FIG. 4, actuator 12 is operatively connected to air scoop 10 by linkage means 13. Upon actuation from a power source (not shown) actuator 12 moves air scoop 10 to its tilted position as shown by the dash lines in FIG. 4. Electrical, pneumatic or hydraulic control systems are conventional and could each be utilized to control actuator 12 upon a manual or automatic signal from the aircraft's pilot compartment. Such signal, if so desired, can be integrated with the aircraft control system for the wing flaps, whereby a predetermined movement of flaps 4 would send a signal to actuator 12 for moving air scoop 10 in a direction determined by the movement of flaps 4.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

We claim as our invention:

1. An aircraft comprising: a fuselage, wings with movable flaps, a tail section, a plurality of engines, at least one of said engines being positioned in said fuselage, control means, downwardly facing air inlet means for said at least one engine, said air inlet means including a movable lip portion and normally providing unrestricted ram air to said engine, said movable lip portion of said air inlet means, when actuated by said control means, providing ingestion protection for said at least one engine during taxiing, takeoff and landing.

2. An aircraft as defined in claim 1 wherein said movable lip portion of said air inlet means, when in actuated position, also provides additional lift during takeoff and landing.

3. In an aircraft the combination comprising, a fuselage, a wing low mounted on each side of said fuselage, an aerodynamic flap on each wing, an air duct in said fuselage, and supplying air to an air consuming means, an air scoop means for supplying air to said air duct, said air scoop means comprising means for consuming all boundary layer air adjacent to the underside of said fuselage forward of said air scoop means, said air scoop means comprising means for preventing ingestion of foreign material in said air duct, and said means for preventing ingestion in combination with each wing flap comprising means for forming one substantially continuous efficient aerodynamic flap from the outboard tip of one wing flap to the outboard tip of the other wing flap.

4. In an aircraft the combination comprising, a fuselage, a low wing mounted on each side of said fuselage, an aerodynamic flap on each wing, and an air scoop pivotally mounted on said fuselage for pivotal movement between a horizontal position and a tilted position about a transverse axis, said air scoop being underside of said fuselage for supplying air to an engine on the aircraft, said transverse axis passing thru said air scoop intermediate the leading and trailing edges thereof and extending in the same general direction as the longitudinal axis of said flaps whereby with the air scoop positioned horizontally all boundary layer air adjacent the underside of said fuselage forward of the air scoop is consumed for supplying the engine, and the portion of said scoop forwardly of said transverse axis being of greater length than the distance between said scoop and said fuselage whereby with the scoop in the tilted position an efficient substantially continuous areodynamic flap is formed from the outboard end of the flap on one wing across the bottom of the fuselage to the outboard end of the flap on the other wing, and flow of incoming air is diverted around said scoop for the prevention of ingestion of foreign material by the engine.

5. In air aircraft the combination comprising, a fuselage, a low wing mounted on each side of said fuselage, an aerodynamic flap on each wing, each flap extending outwardly chordwise from its wing root, an air duct in said fuselage for supplying air to an engine, and an air scoop pivotally mounted on the underside of said fuselage about a transverse axis extending in the same general direction as the longitudinal axis of said flaps for supplying air to said air duct, said air scoop when in a first position constituting means for consuming all boundary layer air adjacent to the underside of said fuselage forward of said air scoop, said air scoop when in a second position constituting means for preventing ingestion of foreign material by said air duct, and said air scoop when in said second position also constituting means between the inboard ends of said flaps for forming therewith one substantially continuous aerodynamic flap.

6. An aircraft having a fuselage, wings with movable flaps, a tail section, and at least one reaction type engine positioned between said wings and tail section, downwardly facing air inlet means for said engine including a movable lip portion, and control means for positioning said movable lip portion of said air inlet means to provide ingestion protection for said engine without substantial reduction of air flowing thereto and lift augmenting for said aircraft during takeoff and landing of said aircraft.

7. An aircraft having a fuselage, wings with movable flaps, a tail section, and at least one reaction type engine positioned in said fuselage between said wings and tail section, a movable air inlet means for said engine, and control means for positioning said air inlet means to provide ingestion protection for said engine, said movable air inlet means, when actuated, comprising a lift flap between said wing flaps to thereby provide a substantially continuous flap system for lift augmenting during takeoff and landing of said aircraft.

8. An aircraft having a fuselage, wings with movable flaps, said flaps having a longitudinal axis, a tail section, and at least one reaction type engine positioned between said wings and tail section, a downwardly facing air inlet means for said engine, said air inlet means including a movable portion having a transverse axis extending in the same general direction as the longitudinal axis of said flaps, and control means for positioning said movable portion of said air inlet means to provide ingestion protection for said engine without substantial reduction of air flowing thereto and lift augmenting for said aircraft during takeoff and landing of said aircraft.

9. An aircraft as defined in claim 8 wherein said engine is positioned in said fuselage and said movable portion of said air inlet means, when actuated, comprises a lift flap between said wing flaps to thereby provide a substantially continuous lift flap system for said aircraft.

10. An aircraft comprising: a fuselage, wings with movable flaps, a tail section, a plurality of engines, at least one of said engines being positioned in said fuselage, control means, air inlet means for said at least one engine, said air inlet means including a movable lip portion and normally providing unrestricted ram air to said engine, said movable lip portion of said air inlet means, when actuated by said control means, providing ingestion protection for said at least one engine during taxiing, takeoff and landing, said movable lip portion of said air inlet means, when in actuated position, also providing additional lift during takeoff and landing, said movable lip portion of said air inlet means being positioned so as to comprise a flap means in alignment with said wing flaps.

11. An aircraft comprising: a fuselage, wings with movable flaps, a tail section, a plurality of engines, at least one of said engines being positioned in said fuselage, control means, air inlet means for said at least one engine, said air inlet means including a movable lip portion and normally providing unrestricted ram air to said engine, said movable lip portion of said air inlet means, when actuated by said control means, providing ingestion protection for said at least one engine during taxiing, takeoff and landing, said movable lip portion of said air inlet means comprising a tapered element pivotably mounted at a location upstream of said engine to normally define an extension of an engine air inlet channel, said control means including an actuating means operatively connected to said element to pivot same so as to substantially block said normal ram air flow, whereby air is drawn into said inlet channel from around said element thus preventing harmful material from entering said engine.

12. An aircraft as defined in claim 11 wherein said tapered element, when actuated, also provides additional lift during takeoff and landing.

13. An aircraft having a fuselage, wings with movable flaps, a tail section, and at least one reaction type engine positioned between said wings and tail section, air inlet means for said engine including a movable lip portion, and control means for positioning said movable lip portion of said air inlet means to provide ingestion protection for said engine without substantial reduction of air flowing thereto and lift augmenting for said aircraft during takeoff and landing of said aircraft, said engine being positioned in said fuselage and said movable lip portion of said air inlet means, when actuated, comprising a lift flap between said wing flaps to thereby provide a substantially continuous lift flap system for said aircraft.

References Cited in the file of this patent
UNITED STATES PATENTS

| | | |
|---|---|---|
| 2,509,890 | Stalker | May 30, 1950 |
| 2,863,620 | Vautier | Dec. 9, 1958 |

FOREIGN PATENTS

| | | |
|---|---|---|
| 785,721 | Great Britain | Nov. 6, 1957 |